March 30, 1965  J. H. LEPP  3,175,830
SINGLE BEATER MANURE SPREADER
Filed Feb. 26, 1963  3 Sheets-Sheet 1
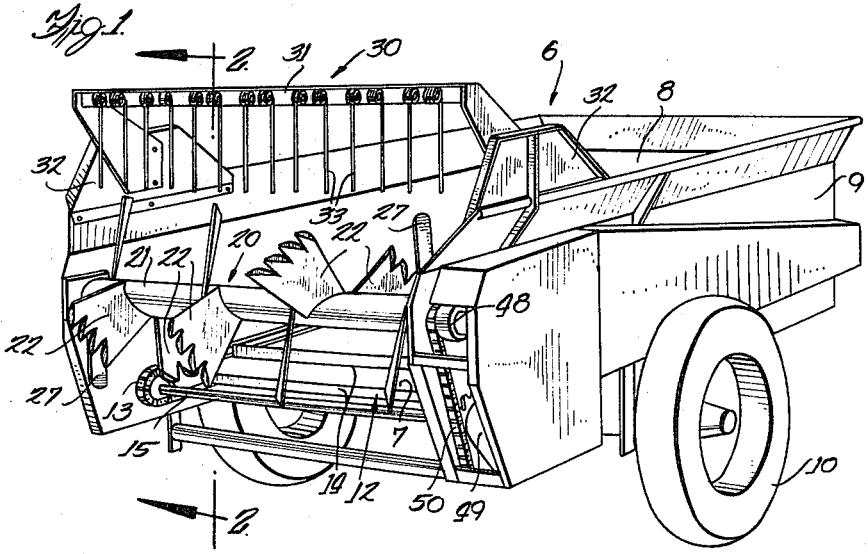

March 30, 1965 J. H. LEPP 3,175,830
SINGLE BEATER MANURE SPREADER
Filed Feb. 26, 1963 3 Sheets-Sheet 2
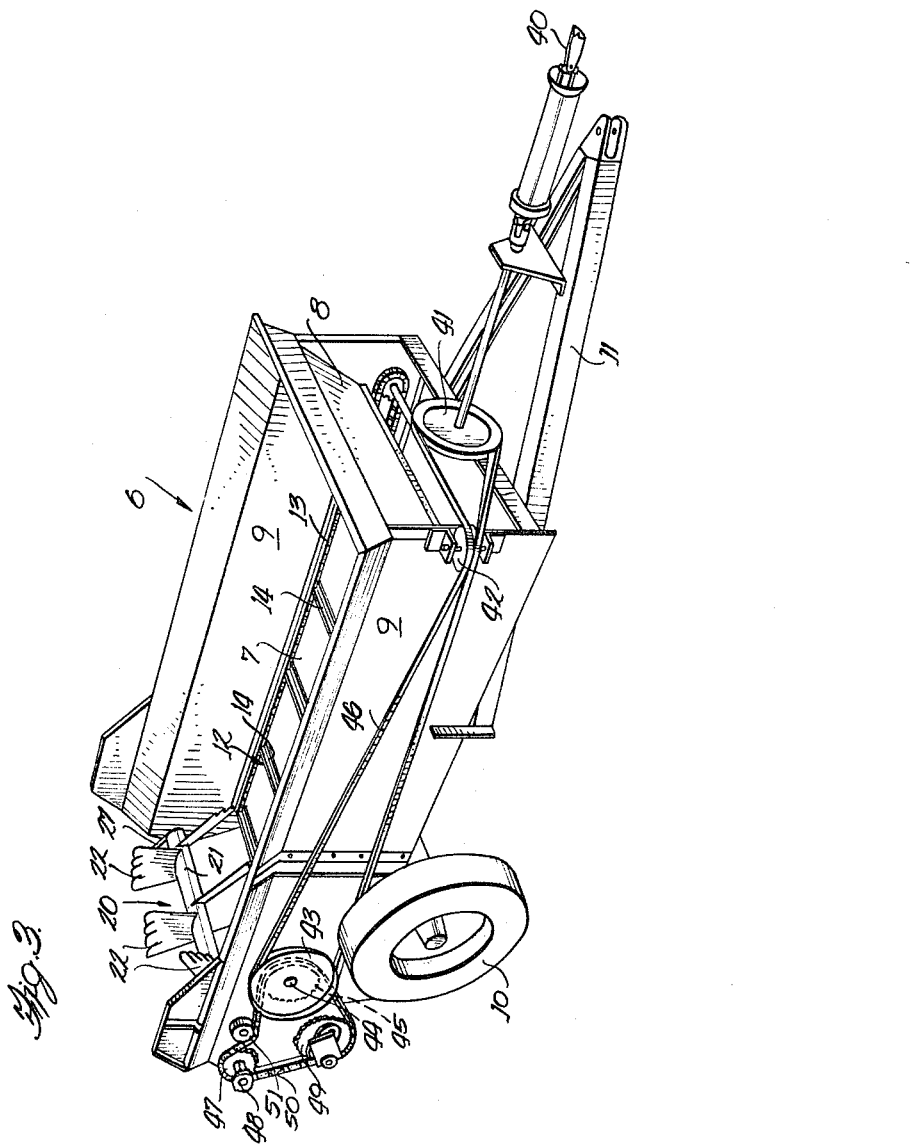

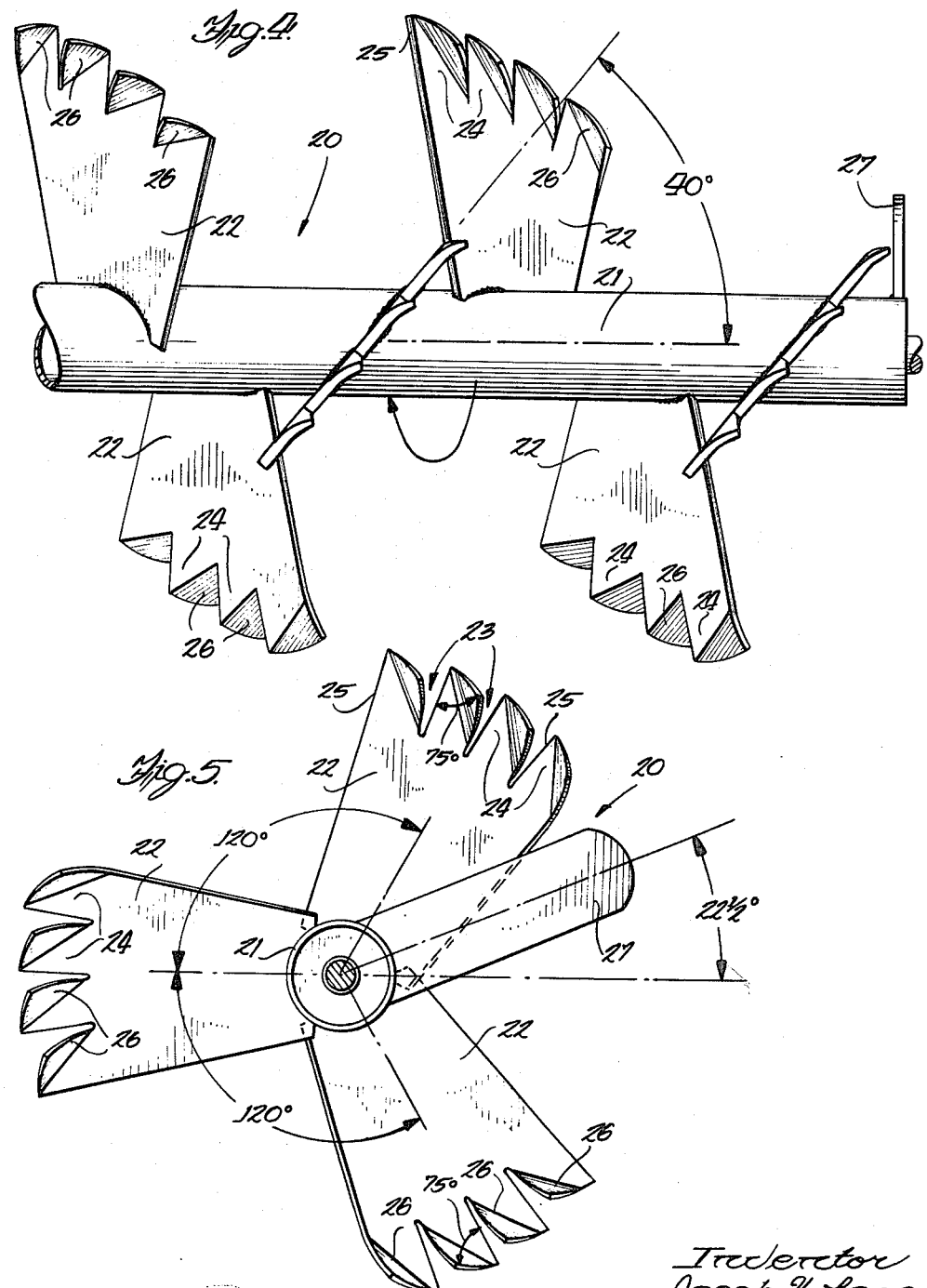

United States Patent Office 3,175,830
Patented Mar. 30, 1965

3,175,830
SINGLE BEATER MANURE SPREADER
Jacob H. Lepp, Grimsby, Ontario, Canada, assignor to International Harvester Company, Chicago, Ill., a corporation of New Jersey
Filed Feb. 26, 1963, Ser. No. 261,004
9 Claims. (Cl. 275—6)

The present invention relates generally to improvements in manure spreaders and the like, and more particularly to new and improved single beater paddle design manure spreaders.

In the field of manure spreaders, it has been the general practice to employ several rotary units at the open end of the box, some of which function to cut and shread the material while the remainder function as spreaders. Although spreaders such as this have served their purpose satisfactorily, the plurality of beater units each constitute potential area of mechanical trouble and add a considerable amount to the overall cost of the spreader. Single beater and spreader units have been provided; however, they have not proved entirely satisfactory under all conditions of service for the reason that considerable difficulty has been experienced attaining a wide, even spread especially in frozen or compacted materials.

The general purpose of this invention is to provide a single beater spreader which embraces all the advantages of similarly employed spreaders and possesses none of the aforedescribed disadvantages. To attain this the present invention contemplates a unique single beater having a plurality of bear-claw-shaped paddles and a pair of blades that function both as counterweights and scrapers, co-operating with a rake which overlies the beater to provide an even spread over a wide angle.

An object of the present invention is the provision of a single beater spreader that will provide a wide, even spread.

A further object of the invention is the provision of a paddle design single beater spreader having scoops to facilitate spreading of the material.

These and other objects of the invention will become more apparent from the specification and drawings, wherein:

FIGURE 1 is a perspective view of the spreader taken from the rear;

FIGURE 2 is a sectional view of the spreader taken along lines 2—2 of FIGURE 1;

FIGURE 3 is a perspective view of the spreader taken from the front;

FIGURE 4 is a side elevation view of the rotary unit; and

FIGURE 5 is an end elevation view of the rotary unit.

Referring now to the drawings, wherein like reference characters designate like or corresponding parts throughout the several views, there is shown in FIGURE 1 a perspective view of the spreader which comprises an open ended box designated 6 having a bottom 7, a front 8, and a pair of sides 9. The open ended box 6 is transported over the ground by a pair of wheels 10 and is pulled by a tractor or the like which is connected to the yoke 11.

The spreader is provided with a bed conveyor generally designated 12 comprising a pair of continuous chains 13 and a plurality of connected slats 14. The bed conveyor 12 moves rearwardly over the bottom 7 of the box and is driven by the rear shaft 15 which projects through the side 9 of the box.

The spreader is equipped with a single rotary unit generally designated 20 comprising a shaft 21 and a plurality of bear-claw paddles 22 secured to said shaft 21 at an angle of approximately 40° to the longitudinal axis of said shaft. As can be best seen in FIGURES 4 and 5 the bear-claw paddles are provided with a plurality of U-shaped slots 23 in their peripheral edge forming teeth 24. The forward edge 25 of each tooth functions as a cutting edge for the paddle and the rear edge of each tooth is bent such that it extends outwardly from the material-engaging surface of the paddle to form scoops 26 which function to spread the sheared material. A radially extending scraper blade 27 extends from each end portion of shaft 21 and functions to scrape material that adheres to sides 9 of the box and also functions as a counterweight to dynamically balance the rotary unit 20.

As indicated in FIGURE 2, the rotary unit 20 is located with respect to the bed conveyor 12 above and slightly to the rear thereof and rotates, as seen in FIGURE 2, in a counterclockwise manner.

As seen in FIGURES 1 and 2, a rake generally designated 30 is provided above the rotary unit 20. Said rake comprises a plurality of spring arms 33 mounted on a cross bar 31 which is carried by said extensions 32 of the box. The rake 30 functions to prevent large pieces of material from being thrown from the box and also to assist in breaking up the material.

Referring now to the FIGURE 3, the drive mechanism for the spreader will be described. It should be noted that, the power take-off drive is for purposes of illustration only. The invention herein described could obviously be utilized on a spreader having an auxiliary motor, a wheel drive take-off or that is self-propelled. The power take-off shaft 40 drives a first pulley designated 41 which is mounted on the front end of the box 6. A pair of idler pulleys 42 are mounted at one of the front corners of the wagon. A stub shaft 44 projecting outwardly from one of the sides 9 of the box near its open end carries a second pulley 43 and also a sprocket 45. An endless V-belt 46 transmits the rotary motion from the first pulley 41 to the second pulley 42. Tension in the endless V-belt 46 can be varied by adjusting the position of stub shaft 44 along the longitudinal direction of the box 6. A throwout clutch 48 and a sprocket 47 are mounted on the end portion of rotary unit 20 which extends through the side 9 of the box. When the throwout clutch 48 is disengaged the rotary motion of sprocket 47 will not be transmitted to the rotary unit 20. However, when the clutch is engaged the rotary motion of sprocket 47 will be transmitted in direct ratio to the rotary unit 20.

The bed conveyor 12 must be driven at a relatively slow speed as compared to the rotary unit 20, and, therefore, some type of speed reduction is generally utilized. In the past ratchet and pawl arrangements have been used which result in a step-by-step movement of the bed conveyor. A movement such as this results in very high repeated torque concentrations in the shaft and continuous chains. Worm gear drives have been utilized in an effort to eliminate the step-by-step motion; however, worm gear drives are very inefficient. To provide an efficient drive for the bed conveyor 12 having a uniform speed, a planetary gear speed reduction unit 49 has been mounted on the outward extending portion of rear shaft 15. The planetary gear speed reduction unit is of conventional design, for example as shown in the U.S. patent to Johanson, No. 1,128,684. An endless chain 50 connects sprocket 45, sprocket 47, and the planetary gear speed reduction unit 49. The tension in endless chain 50 can be adjusted by the tension adjusting means 51.

*Operation*

The open ended box 6 after being filled with material is transported to the area where the material is to be spread and power to the bed conveyor and rotary unit is then engaged. The bed conveyor 12 slowly moves the material towards the open end of the box where the rotary unit 20 is rotating at a relatively high speed. The cutting edges 25 of the bear-claw paddles continuously shear material from the mass being moved by the bed conveyor. The material sheared from the mass by the cutting edges is held by the scoops 26 formed by the teeth 24 of the bear-claw paddles. As the paddle continues to rotate in a counterclockwise direction as seen in FIGURE 2, the material is thrown from the scoops formed by the paddle and is spread evenly behind the spreader. If large portions of material are torn from the mass, the rake 30 will prevent these large pieces from being thrown from the box and will assist in breaking the material into smaller pieces. The scraper blades 27 which rotate with the rotary unit 20 will clear all material that adheres to the inside of the box sides. When the box is nearly empty of material, the throwout clutch 48 can be disengaged, stopping the rotation of the rotary unit 20 but having no effect upon the movement of bed conveyor 12 and the last bit of material can thereby be removed from the wagon.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A single beater spreader comprising an open ended box, a rotary unit traversing the open end of said box, a plurality of paddles fixedly secured to said rotary unit at an angle to its axis of rotation, each said paddle having a plurality of U-shaped notches formed in its peripheral edge thereby forming teeth, a leading portion of each said tooth with respect to the direction of rotation of said rotary unit forming a cutting edge, a portion of each said tooth trailing said cutting edge being bent toward said cutting edge to form a scoop for throwing material.

2. A single beater spreader comprising an open ended box, a rotary unit traversing the open end of said box, a plurality of paddles fixedly secured to said rotary unit at an angle to its axis of rotation, each said paddle having a plurality of U-shaped notches formed in its peripheral edge thereby forming teeth, a leading portion of each said tooth with respect to the direction of rotation of said rotary unit forming a cutting edge, a portion of each said tooth trailing said cutting edge being bent toward said cutting edge to form a scoop for throwing material, rake means comprising a row of spring teeth coextensive and overlying said rotary unit for restricting material being thrown from the box.

3. A single beater spreader comprising an open ended box, a rotary unit traversing the open end of said box, a plurality of paddles fixedly secured to said rotary unit at an angle to its longitudinal axis, said paddles having a plurality of U-shaped notches formed in the peripheral edges thereby forming teeth, one edge of said teeth forming the cutting edge for said spreader, the rear corner of each tooth bending forward and downward to form a scoop for scattering material, counterweight and clearing means secured to each end portion of the rotary unit in cooperative relationship to the sides of said open ended box to clear material from said sides and to dynamically balance said rotary unit.

4. The invention as set forth in claim 3 wherein rake means are provided comprising a row of spring teeth coextensive and overlying said rotary unit for restricting material being thrown from the box.

5. A spreader comprising: a wheel box having an open end; means associated with said box for moving a mass of material along the bottom of said box towards its open end; a rotary unit traversing the open end of said box; a plurality of bear-claw paddles fixedly secured to said rotary unit at an angle to the axis of rotation of said rotary unit, each said paddle having teeth radiating therefrom, a leading portion of each said tooth with respect to the direction of rotation of said rotary unit forming a cutting edge, a portion of each said tooth trailing said cutting edge being bent towards said cutting edge to form a scoop for throwing material.

6. A rotary unit for a manure spreader of the type having an open ended box and a bed conveyor comprising; an elongated rotary unit mounted on the open end of said box and extending transversely thereof, a plurality of bear-claw paddles with teeth radiating therefrom fixedly secured to said elongated rotary unit at an angle to the axis of rotation of said elongated rotary unit, the leading portion of the teeth with respect to the direction of rotation of said rotary unit forming shearing edges, and the trailing portions of the teeth to the rear of said shearing edges being bent toward said shearing edges such that they extend outwardly from the material-engaging surface of said bear-claw paddles forming scoop means that hold and give outward direction to the material sheared by the leading edges of said teeth.

7. A spreader comprising: a wheeled box having an open end; means for moving material along the bottom of said box towards the open end of said box; a rotary unit traversing the open end of said box; a plurality of bear-claw paddles with teeth radiating therefrom fixedly secured to said rotary unit at an angle to the axis of rotation of said rotary unit, a leading portion of each said tooth with respect to the direction of rotation of said rotary unit forming a cutting edge, a portion of each said tooth trailing said cutting edge being bent toward said cutting edge to form a scoop for throwing material.

8. In a manure spreader of the type having an open ended wheeled box and a bed conveyor for moving material towards the open ned of said box, the improvement comprising: a rotary unit including a tubular member traversing the open end of said box, a plurality of bear-claw paddles with teeth radiating therefrom fixedly secured to said tubular member at an angle to the axis of rotation of said tubular member, a leading portion of each said tooth with respect to the direction of rotation of said rotary unit forming a cutting edge, a portion of each said tooth trailing said cutting edge being bent toward said cutting edge to form a scoop for throwing material.

9. In a manure spreader of the type having an open ended wheeled box and a bed conveyor for moving material towards the open end of said box, the improvement comprising: a rotary unit including a tubular member traversing the open end of said box, a plurality of bear-claw paddles with teeth radiating therefrom fixedly secured to said tubular member at an angle of approximately 40° to the axis of said tubular member, each said tooth having a leading portion with respect to the direction of rotation of said rotary unit forming a cutting edge and a portion trailing said cutting edge, the trailing portions of the teeth of said bear-claw paddle being bent toward their respective cutting edges with an angle of approximately 75° between the bent trailing portions and the bodies of said respective bear-claw paddles.

References Cited by the Examiner

UNITED STATES PATENTS

| | | | |
|---|---|---|---|
| 947,374 | 1/10 | Cook | 275—3 |
| 1,103,272 | 7/14 | Davis | 275—5 |
| 1,128,684 | 2/15 | Johanson | 74—750 |
| 1,282,854 | 10/18 | Kemp | 275—3 |
| 1,838,755 | 12/31 | Gamble | 275—6 |
| 2,240,720 | 5/41 | Selhorst | 275—6 |
| 2,969,986 | 1/61 | Dyke | 275—6 |
| 3,036,837 | 5/62 | Miller | 275—6 |
| 3,069,172 | 12/62 | Beiler | 275—6 |

T. GRAHAM CRAVER, *Primary Examiner.*

WILLIAM A. SMITH III, *Examiner.*